United States Patent
Tussy

(10) Patent No.: US 9,487,336 B2
(45) Date of Patent: Nov. 8, 2016

(54) LIQUID CONTAINER AND STAND

(71) Applicant: Kevin Alan Tussy, Las Vegas, NV (US)

(72) Inventor: Kevin Alan Tussy, Las Vegas, NV (US)

(*) Notice: Subject to any disclaimer, the term of this patent is extended or adjusted under 35 U.S.C. 154(b) by 0 days.

(21) Appl. No.: 14/645,356

(22) Filed: Mar. 11, 2015

(65) Prior Publication Data
US 2015/0259114 A1 Sep. 17, 2015

Related U.S. Application Data

(60) Provisional application No. 61/952,058, filed on Mar. 12, 2014.

(51) Int. Cl.
| | |
|---|---|
| *A47G 19/22* | (2006.01) |
| *B65D 51/24* | (2006.01) |
| *B65D 23/00* | (2006.01) |
| *B65D 81/36* | (2006.01) |
| *B23P 19/00* | (2006.01) |
| *F16M 11/04* | (2006.01) |
| *F16M 11/22* | (2006.01) |

(52) U.S. Cl.
CPC ......... *B65D 51/249* (2013.01); *A47G 19/2255* (2013.01); *A47G 19/2266* (2013.01); *B23P 19/00* (2013.01); *B65D 23/001* (2013.01); *B65D 81/365* (2013.01); *F16M 11/04* (2013.01); *F16M 11/22* (2013.01); *Y10T 29/49826* (2015.01)

(58) Field of Classification Search
CPC .................... A47G 19/2266; A47G 19/2255; A47G 19/02; B65D 23/001; B65D 25/24; B65D 81/365; B65D 41/00; B65D 51/249; F16M 11/04; F16M 11/22; Y10T 29/49826; B23P 19/00
USPC ......... 248/127, 158, 146, 154, 176.1, 181.2, 248/188.1, 188.91, 346.01, 346.03, 346.2; 220/630, 666, DIG. 13, 457, 822, 560
See application file for complete search history.

(56) References Cited

U.S. PATENT DOCUMENTS

| | | | | |
|---|---|---|---|---|
| 5,638,982 A | * | 6/1997 | Spector | A63B 39/00 206/457 |
| 5,662,241 A | * | 9/1997 | Sorensen | B65D 23/001 220/630 |
| 7,959,036 B2 | * | 6/2011 | Koh | B65D 1/32 215/43 |
| D718,146 S | | 11/2014 | Tussy | |
| 2003/0201201 A1 | | 10/2003 | Cheng | |
| 2004/0173620 A1 | * | 9/2004 | Trevino | B65D 25/24 220/630 |
| 2012/0067756 A1 | * | 3/2012 | Jansen | B65D 1/0223 206/457 |

FOREIGN PATENT DOCUMENTS

| | | |
|---|---|---|
| WO | WO 2007/058500 | 5/2007 |
| WO | WO 2007/090439 | 8/2007 |

* cited by examiner

*Primary Examiner* — Nkeisha Smith
(74) *Attorney, Agent, or Firm* — Weide & Miller, Ltd.

(57) ABSTRACT

A liquid container cooperates with a stand to present the container in a display position with the container sealed, and an open position with the container unsealed. The stand is configured to support the liquid container in first and second positions, with the container being closed in the first position and open in the second position. The stand and the liquid container may create a decorative presentation in each of the first and second positions. In the first position the container is sealed by a cap that is within a depression in the stand and may be unitary with the stand. In the second position, the container may be sealed or unsealed with the container opening upward the stand supporting and cradling the portion of the container that is opposite the opening, to maintain the opening upward to prevent spillage of liquid.

5 Claims, 5 Drawing Sheets

LIQUID CONTAINER AND STAND

1. FIELD OF THE INVENTION

The present invention relates generally to liquid containers, and more specifically to stands for their display.

2. BACKGROUND OF THE INVENTION

Liquid container stands, particularly for beverages, are widely used in the food and beverage industry. Such stands generally support a container in a first position with the opening to the container facing upward. These stands necessitate removal of the bottle from the stand before pouring. When the bottle and the stand are designed to present a coordinated design, removal of the bottle from the stand breaks the design until the bottle is replaced to the first position in the stand. Other bottles may be configured with a flip cap that allows the bottle to be stored opening side down so that the viscous contents of the bottle are maintained near the bottle's opening.

These prior art bottles suffer from numerous drawbacks. First, these prior art bottle lack interesting or attractive design elements. Such bottles are often clear plastic covered in labels. To support the prior art bottles the bottom is flat, which limits the aesthetics of the bottle. Absent the flat bottom, the bottle would tip over, cause the contents to spill. In addition, subject to the shape of the bottle, the cap must remain on the bottle for the bottle to be opened by a flip cap, or if the cap is removed, the bottle may not be supported, absent a flat surface opposing the opening in the bottle.

There is thus a need in the art for a bottle which has a new shape but which may be selectively sealed and opened, to access the content, and which may be stored in sealed state or an open state. The prior art bottles do not provide the features and advantages of the bottle described below.

SUMMARY OF THE INVENTION

A liquid container interacts with a stand to prevent liquid from entering or exiting therefrom. The stand is configured to support the liquid container in first and second positions, with the container being closed in the first position and open in the second position. The stand and the liquid container may create a decorative presentation in each of the first and second positions.

To overcome the drawbacks of the prior art and provide additional advantages, a liquid container and associated stand assembly in disclosed. The liquid container is formed by a wall to create an inner chamber configured to contain a liquid. The wall forms a threaded neck with a central aperture providing access to the inner chamber, and neck threads are on an outer surface of the neck. The portion of the wall opposing the neck being non-planar.

Also part of this embodiment is a stand having a top surface and an opposing bottom surface. The bottom surface is configured to support the stand generally level when placed on a planar support surface. The top surface has a shape configured to mate with and support the non-planar wall of the container opposing the neck. The stand also includes a threaded cap configured to rotationally attach to the neck threads such that the cap centrally located in the stand.

In one configuration, the container is round such that the portion of the wall opposing the neck is curved and the top surface of the stand has a corresponding curvature to support, and retain the container in the stand to prevent the container from tipping when the portion of the wall opposing the neck is supported by the stand. In various configurations, the wall includes surface features to create the appearance of a golf ball, a baseball, a soccer ball, or a football. The cap may be press-fit or glued into an opening in the stand. In one embodiment, the bottom surface of the stand is generally flat.

It is also contemplated that at least a portion of an outer surface of the wall has a greater coefficient of friction than an inner surface of the wall to prevent the container from slipping relative to the stand, when the container is in the stand with the cap not on the threaded neck. In one embodiment at least a portion of the top surface of the stand includes one or more high coefficient of friction elements to inhibit movement of the container relative to the stand when the container is in the stand with the cap not on the threaded neck.

Also disclosed is a container and cooperating stand comprising a chamber formed by an outer wall configured to form the container, the wall having a threaded opening to the chamber and a non-planar wall portion opposing the opening. In this embodiment, the chamber is configured to hold a liquid, but in other embodiments the container may hold other contents such as food, candy, sporting goods items, flavourings, or any other product. Cooperating with the container is a stand including a cap configured to selectively seal and unseal the chamber and support the container when the chamber is unsealed. The stand includes a general flat bottom surface capable of supporting the stand on a flat support surface. A side surface extends upward from the bottom surface to a top surface. The top surface is configured to cradle the non-planar wall portion opposing the opening to prevent tipping of the container when the container is placed in the stand. Also part of the stand is a threaded cap that is configured to seal the chamber of the container.

In one embodiment, the non-planar wall portion opposing the opening prevents the bottle from standing upright on a flat surface. For example, the non-planar wall portion opposing the opening may be round or generally oval. The top surface may be configured to cradle the non-planar wall portion by having a shape with a curvature that matches the non-planar wall portion. At least one gripping surface may be provided on either or both of the top surface of the stand or the non-planar wall portion to prevent or reduce movement of the container relative to the stand.

In one exemplary configuration the stand may include a depression into which the cap is secured forming the cap and the stand a unitary element. It is contemplated that the container may be shaped to resemble a ball selected from the following types of balls: a golf ball, a baseball, a tennis ball, a soccer ball, a billiards ball, a basketball, a bowling ball, a cricket ball, a football, a rugby ball, and a volleyball.

Also disclosed is a method for displaying a container on a stand when the container is sealed, and supporting the container when the container is unsealed. In one example method, there is provided a chamber containing a liquid such that the chamber is formed by a wall. The wall has a threaded opening to the chamber and the wall portion opposing the opening being non-planar. The method operation also includes providing a threaded cap that is part of the stand on the container that seals the liquid in the container. The stand has a curved top surface and a bottom surface. A user would then lift the container containing the liquid from a display position with the threaded opening positioned downward and sealed by the stand. The stand is supported on a bottom surface of the stand by a support surface. The user would then rotate the container to establish the opening pointed upward and rotating the stand to remove the threaded cap. The threaded cap is connected to the stand to thereby open the container. Before or after pouring, the user places the stand on the support surface, with the bottom surface of the stand in contact with the support surface.

The user pours or dispenses liquid from the container, and can then place the container in the stand with the threaded opening facing upward such that the curved top surface of the stand supports the non-planar wall portion to maintain the threaded opening facing upward, thereby preventing spillage of the liquid from the container.

The non-planar wall portion may be round and the curved top surface of the stand may also be round but with an inward curvature. The threaded cap may be removable from the stand.

The curvature of the top surface of the stand may be generally similar to a curvature of the non-planar wall portion to cause the top surface of the stand to cradle the container. The method may further comprise lifting the container from the stand, the stand acting as a cradle, and then re-attaching the cap to seal the threaded opening, to then return the stand with the attached container to the support surface to establish the container in the display position attached to and supported by the stand.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

BRIEF DESCRIPTION OF THE DRAWINGS

Various other objects, features and advantages of the present invention will become fully appreciated when considered in conjunction with the accompanying drawings, wherein like reference characters denote the same or similar parts throughout the several views. The components in the figures are not necessarily to scale, emphasis instead being placed upon illustrating the principles of the invention. In the figures, like reference numerals designate corresponding parts throughout the different views.

DETAILED DESCRIPTION

Figure 1:
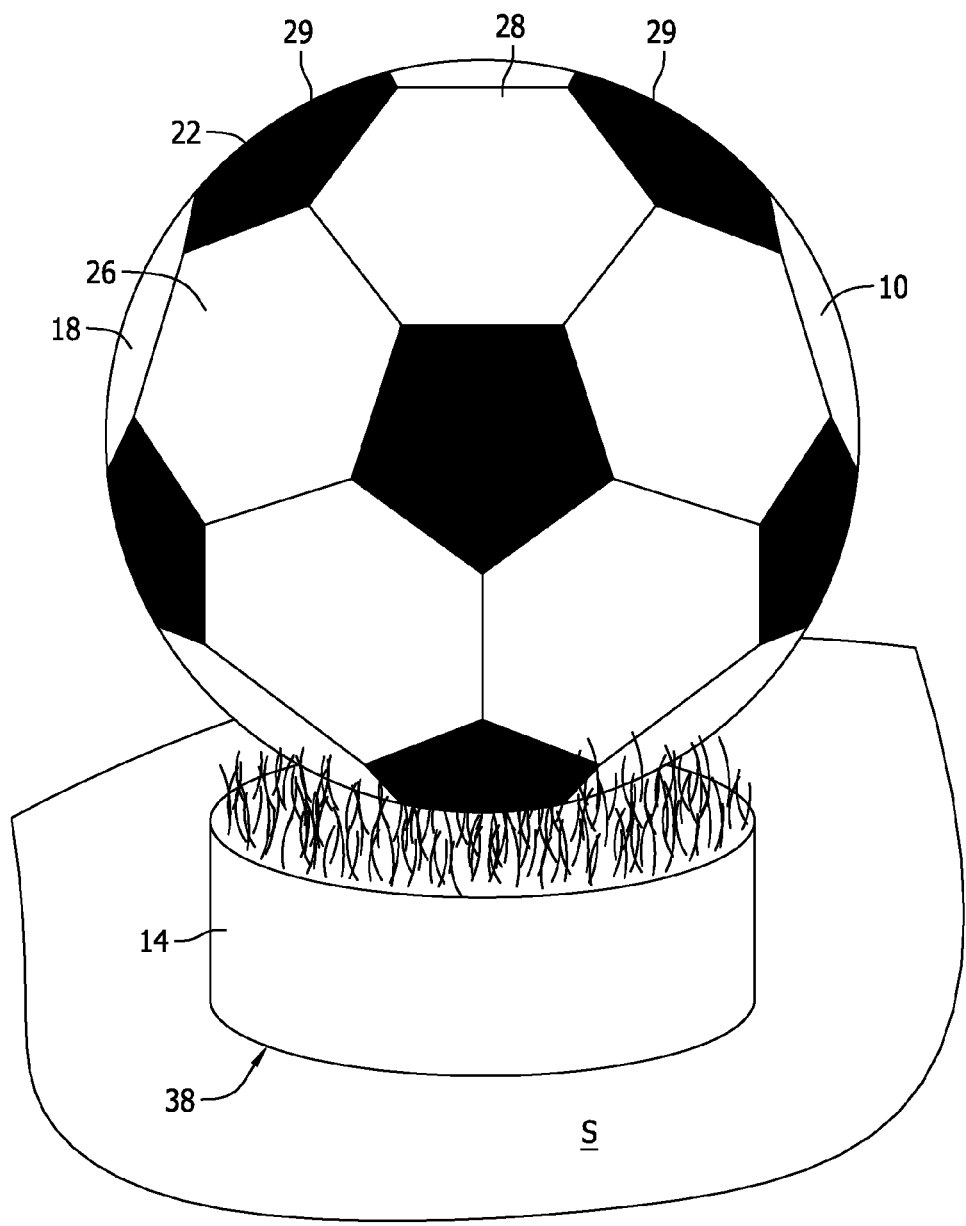
FIG. 1 illustrates a container and stand according to the present invention.

Referring to the drawings the reference numbers which repeat between figures refer to identical or similar components. FIG. 1 shows a liquid container 10 seated within an associated stand 14 according to the present invention. The container 10 may be formed from glass, or from any other material appropriate for containing a given liquid. The container 10 is generally spherical, and includes an outer surface 18 defining a plurality of black pentagonal regions 22 and white hexagonal regions 26. The regions 22, 26 in conjunction with the spherical shape of the container 10 give the container 10 the appearance of a soccer ball, or any ball shape, which may be spherical or oval. In one embodiment, the stand 14 resembles a patch of grass, with the container 10 and the stand 14 thus combining to create a decorative presentation when the container 10 is seated within the stand 14. The outer surface 18 defines an optional resting portion 28 at the top of the container. The resting portion 28 may be a flat or planar area which will support and prevent tipping of the container when the container is placed on the resting portion 28. The resting portion may also be defined as non-planar, such as for example round. This would represent a ball shape, or oval shape. The resting portion 28 is described in more detail below. The top area 29, which is located opposition may be non-planar as shown or described in numerous different embodiments. The stand as described below can support the container on the resting portion (also referred to herein as the non-planar portion opposite the opening) or any portion of the container to insure the liquid in the container does not spill.

Figure 2:
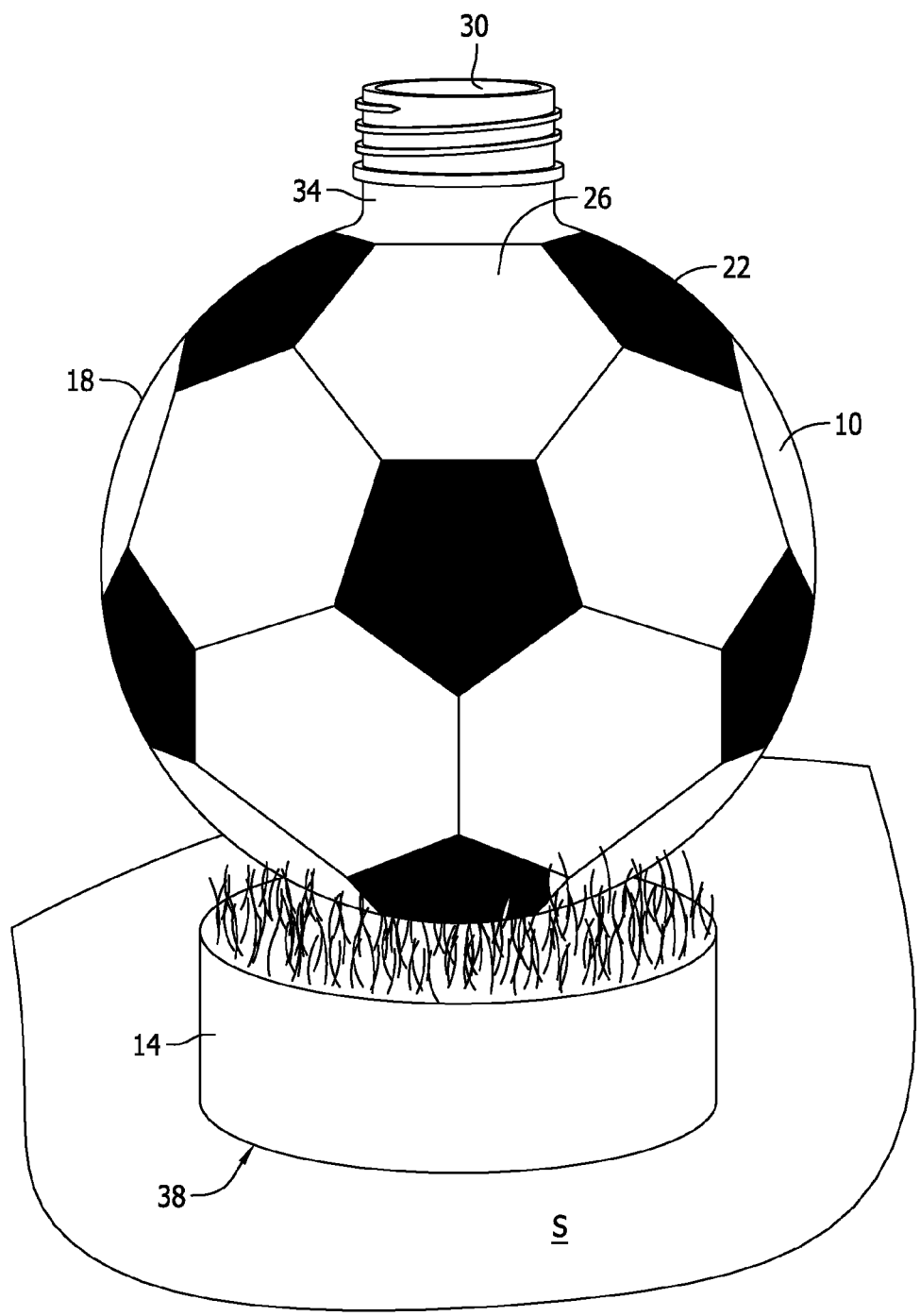
FIG. 2 illustrates the container and stand of FIG. 1, with the stand supporting the container in an open condition.

Turning to FIG. 2, the container 10 includes an opening 30 at the end of a cylindrical neck 34 to allow liquid to enter and exit therefrom. The neck 34 fits into a mating portion (not shown) of the stand 14, with the neck 34 and the mating portion interacting to close the opening 30, thereby preventing liquid from escaping from the container 10. In the embodiment shown, the neck 34 is threaded and screws into a cap. The cap fits into a depression (shown in FIG. 3) in the stand 14 and may optionally secure to the stand 14. In other embodiments, the cap is unitary with the stand and formed as part of the stand. The cap may be permanently attached to the stand or removable from the stand. The opening 30 is capped and fits into and rests against a portion of the stand 14, thereby trapping any liquid in the container 10. However, any other closure mechanism may be utilized within the scope of the present invention, such as but not limited to flip caps, squeeze caps, twist caps, pop tops, slide caps or any other type cap or lid.

The stand 14 includes a supporting surface 38 configured to rest on a table or other surface S. The supporting surface 38 may be at the bottom of the stand 14. In this embodiment, and other embodiments described herein, the supporting surface 38 is substantially flat, and is configured such that the stand 14 supports the container 10 in a substantially inverted position when the container 10 is closed. The supporting surface 38 could be other than flat.

In order to prevent spillage, the container 10 should be opened with the opening 30 pointed substantially upward. This can be achieved by holding the container 10 in one hand grasping the stand 14 with the stand 14 facing upward, and rotating the stand 14 about the container 10 at the neck 34 with the other hand to unblock and thus open the opening 30. The stand 14 may then be set back on the surface S. If the cap of the container 10 is removable from the stand 14, then the container 10 and stand 14 can be removed from the stand 14 and then, with the cap pointing upward, the cap can be removed from the container 10.

The stand 14 is further configured to support the container 10 in at least one other position, when the container 10 is open, as shown in FIG. 2. In this manner, the container 10 and stand 14 provide a decorative presentation whether the container 10 is open or closed. Because in one or more embodiments, the container as a non-planar area opposing the opening, the bottle would not maintain the opening in the upward position if placed on a table or other flat support surface. Instead, it would roll or fall over. The stand as described herein is configured to support the container in an upright or semi-upright position.

Referring to FIGS. 1 and 2, the neck 34 extends from the container 10 substantially opposite from the position of the resting portion 28 (also referred to as the non-planar area opposing the opening) on the outer face 18 of the container 10. The stand 14 is designed to support or cradle the container 10 at the resting portion 28 (the opening facing upward), with the resting portion 28 nested within, supported by or resting adjacent a portion of the stand 14. In this manner, the stand 14 supports and cradles the container 10 with the opening 30 unblocked (unsealed), with the container 10 and the stand 14 continuing to display a decorative presentation. In this arrangement the container 10 could be open, thereby allowing easy pouring of the container 10 contents, and then easily placed, opening up, so the contents do not spill back from the container. The container 10 may have a flat resting portion 28 or the top of the container could be round to more closely resemble a ball. If flat, the flat area may be so small so as to not provide a secure support surface. The stand 14 may have a corresponding round depression (or shape to match the resting portion 28 of the container) to thereby mate with and accept the round profile of the container 10. The container 10 need not include a resting portion 32 in order to practice the present invention.

Figure 3:
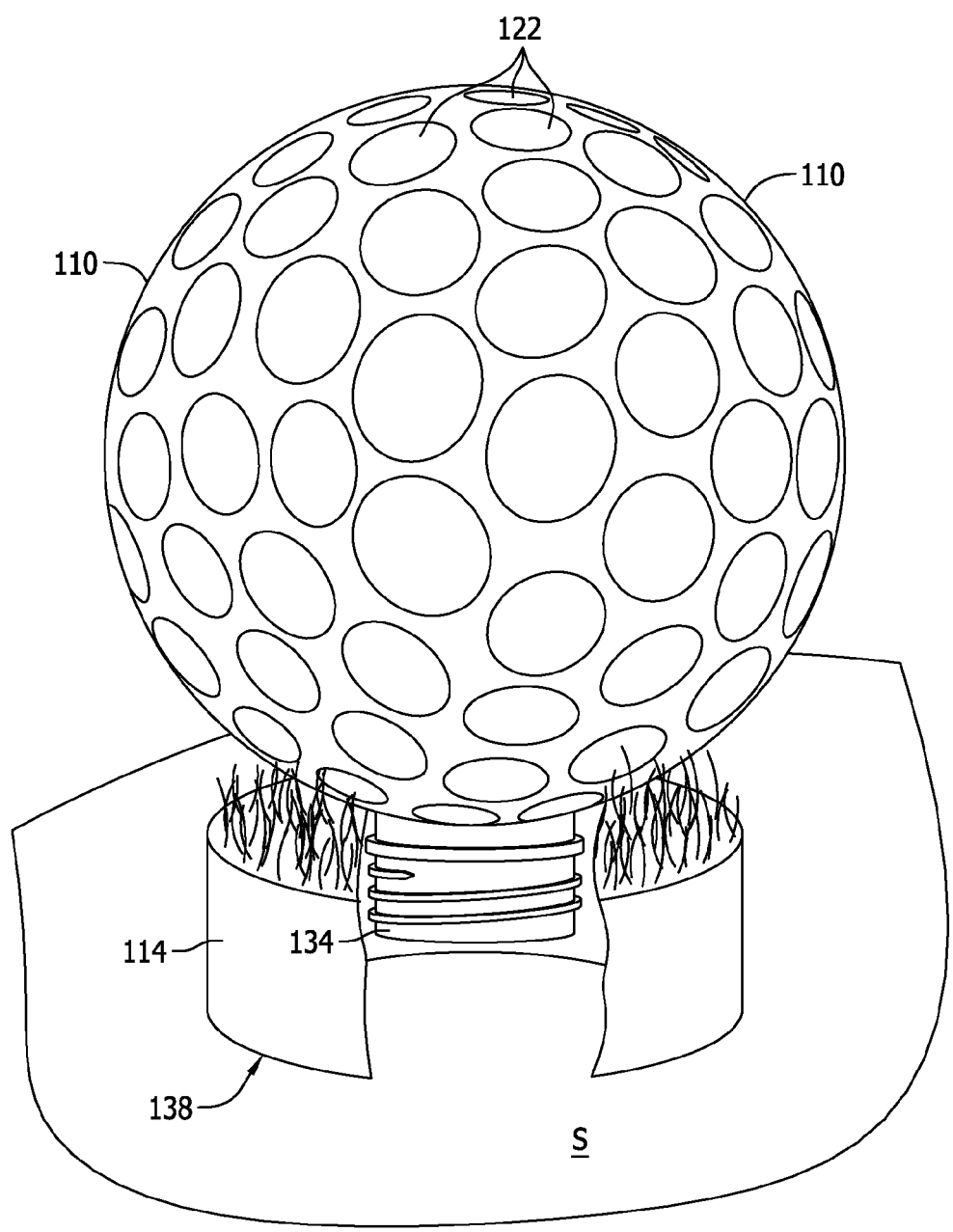
FIG. 3 illustrates an alternative embodiment of a container and stand.

FIG. 3 shows another embodiment of a liquid container 110 seated within an associated stand 114. In this embodiment, the container 110 is shaped like a golf ball. Specifically, the container 110 includes an outer surface 118 defining a plurality of rounded indentations 122, with the indentations 122 representing the dimples of a traditional golf ball. The stand 114 resembles a patch of grass, with the container 110 and the stand 114 thus combining to create a decorative presentation when the container 110 is seated within the stand 114. In other embodiments, the stand 114 could appear as a golf tee. The stand 114 includes a supporting surface 138 configured to rest on a table or other surface S. The supporting surface 138 is substantially flat, and is configured such that the stand 114 supports the container 110 in a substantially inverted position when the container 110 is closed.

The container 110 includes a neck 134 having an opening (not shown) to allow liquid to enter and exit therefrom, with the stand 114 or a cap (which may be glued into the stand 114 or removable from the stand 114) being operable to block the opening while supporting the container 110 as shown in FIG. 3. Additionally, the stand 114 is configured to support the container 110 when the container 110 is open, i.e., when the opening is unblocked or unsealed. As the container 110 in this embodiment is substantially spherical, the container 110 may seat within the stand 114 in a number of different positions with the container 110 open but not spilling liquid (not shown). That is, the portion of the stand 114 configured to support the container 110 when the container 110 is open will necessarily fit one or more corresponding portions of the container 110, given the spherical shape of the container 110. Thus, the portion of the container that is opposite of the opening, or the sides of the container, may be placed on the top surface of the stand when the container is open such that the stand cradles and supports the container to prevent the container from tipping or rolling over, which in turn prevents spillage of the liquid in the container.

Not shown in this figures (see FIG. 5A) is a cap that has threads configured to pair or mate with the threads through rotation (or other connecting mechanism) on the neck 134 of the container to selectively seal and unseal the container 110. The cap may be part of or removable from the stand 114 and located in a depression or recess in the stand.

The container 110 may seat within the stand 114 with the opening pointing substantially upward, or with the opening pointing at any angle sufficient to prevent liquid from escaping from the container 110. The precise minimum angle necessary to prevent spillage will vary depending on factors such as the fullness of the container 110 and the angle of stand 114. It can thus be seen that the container 110 need not have a resting portion to practice the present invention.

Figure 4:
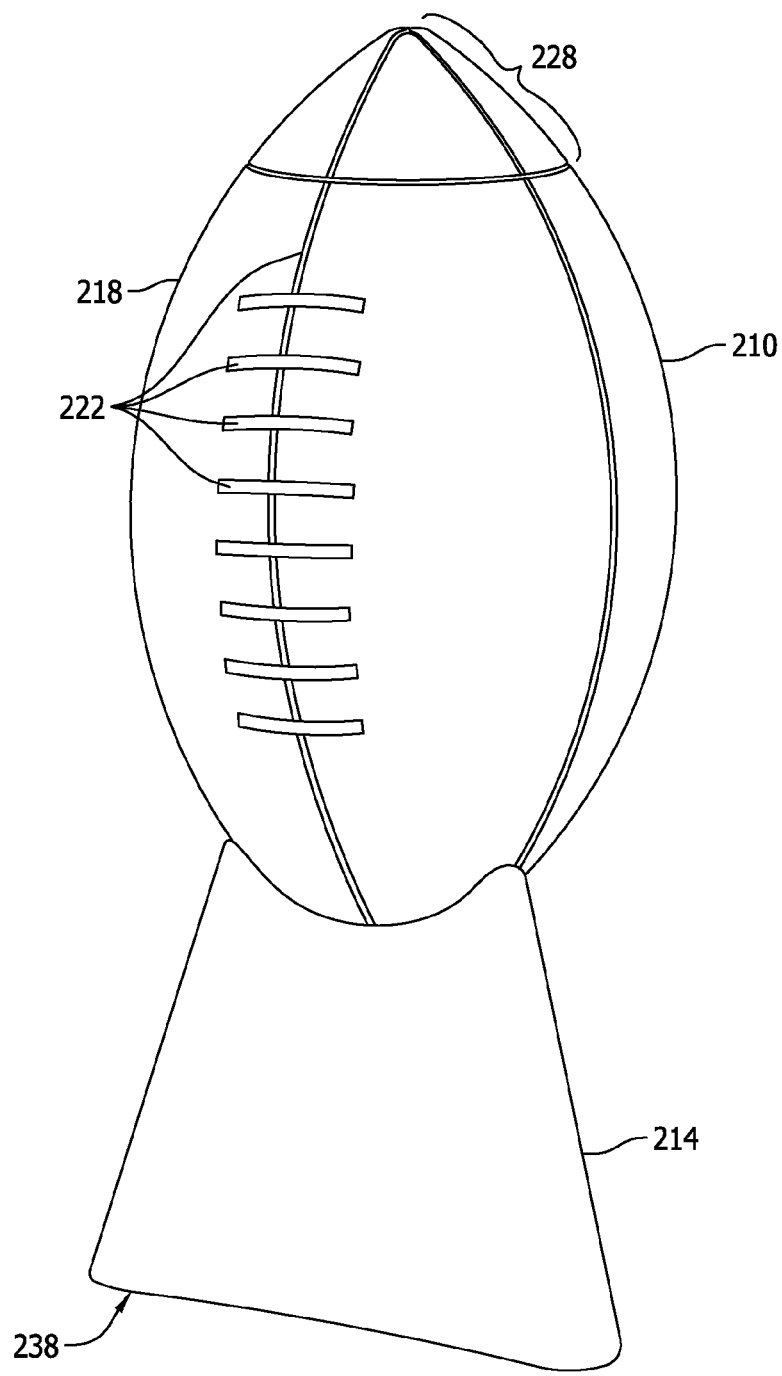
FIG. 4 illustrates an alternative embodiment of a container and stand.

Turning to FIG. 4, yet another embodiment of the present invention illustrates a football-shaped liquid container 210 seated within a stand 214 shaped like a football tee. The container 210 includes an outer surface 218 defining a resting portion 228 and a plurality of decorative elements 222 representing the laces and seams of a traditional football. The container 210 and the stand 214 thus combine to create a decorative presentation when the container 210 is seated within the stand 214. The stand 214 includes a supporting surface 238 configured to rest on a table or other surface S. The supporting surface 238 is substantially flat, and is configured such that the stand 214 supports the container 210 in a substantially inverted position when the container 210 is closed.

The container 210 includes an opening (not shown) to allow liquid to enter and exit therefrom, with the stand 214 being operable to block the opening while supporting the container 210 as shown in FIG. 4. Additionally, the stand 214 is configured to support the container 210 when the container 210 is open, i.e., when the opening is unblocked. Specifically, the stand 214 is configured to support the container 210 at the resting position 228, with the resting portion 228 nesting within and supporting the container or resting adjacent a portion of the stand 214.

Figure 5A:
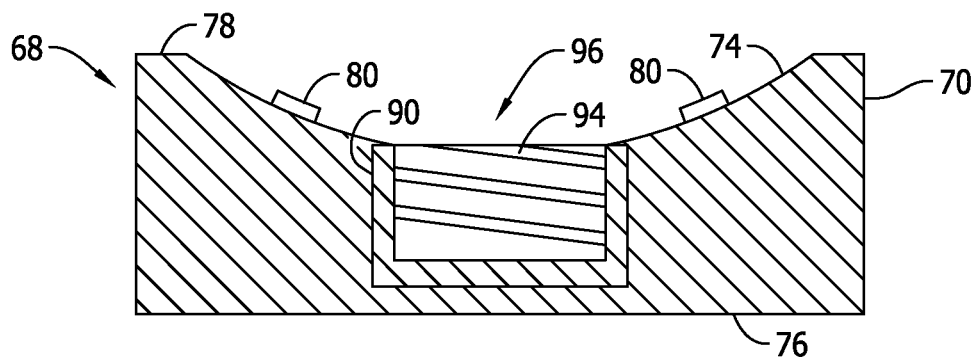
FIG. 5A illustrates a side view of an exemplary central section of the stand.

FIG. 5A illustrate a side view of an exemplary central cross-sectional of the stand. This is but one possible configuration and as such, one of ordinary skill in the art may develop embodiments which utilize a stand with a different cross section, but which do not depart from the claims which follow. As shown, the stand 68 includes a bottom surface 76 which is generally flat or planer, but may be one or more feet, depressions, ridges or other surface elements. The bottom surface 76 is configured to maintain the stand generally level when the stand is placed on a level support surface (not shown).

The stand 68 has a side surface 70 that extends upward from the bottom surface 76. The side surface 70 that connects to a top surface 74. A generally planar top rim 78 may be provided that surrounds the outer circumference of the stand. The top rim 78 may contain or support a decorative material (shown in FIG. 1) and may also support or stabilize the container. The decorative material may comprise, but is not limited to, artificial turf, simulated grass, or any other element.

The central area of the top surface forms a depression or recess as compared to the higher top rim 78. The curvature or arc shape of the top surface is configured to support, cradle, and/or stabilize the container, when the container is in the stand, with the container opening facing upward, such as opposite the stand. The top surface curvatures may generally match the curvature of a non-planar portion of the container (top portion) that is located opposite the opening to the container. Although shown as smooth, the top surface can be of any shape or configuration that supports and cradles the container. Likewise, the stand can be a shape other than round.

Located in the top surface is a depression that forms a recess 96 in the top surface. A cap 90 is configured to fit in the recess 96. The cap may be removable from the recess or secured in the recess. The stand 68 may form the cap 90 from the same plastic material. The cap 90 has threads 94 which rotationally connect to the threads on the neck of the container.

Also shown in FIG. 5A are one or more gripping elements 80 that are part of or extend from the top surface. A portion of or all of the top surface may include gripping surface(s) 80 that has a higher coefficient of friction than injection formed plastic or the side surface 70 of the stand 68. It is also contemplated that instead of or in addition to the gripping surface being on the stand, the gripping surface may be on the container, either all over or in one more spots. The gripping surface 80 prevents or inhibits movement of the container relative to the stand when the container is in the stand to reduce the likelihood of spilling liquid in the container.

Figure 5B:
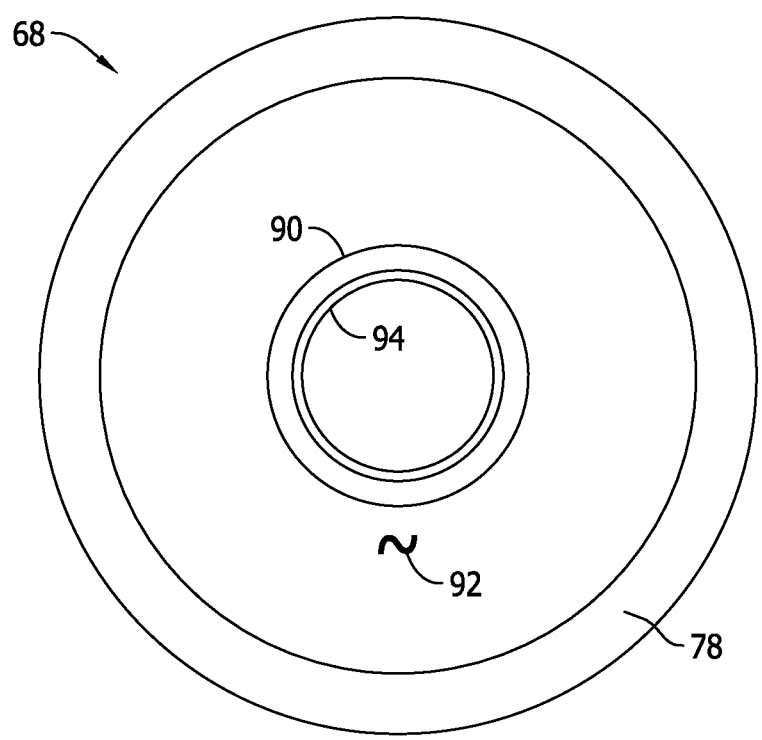
FIG. 5B illustrates a top view of an exemplary central section of the stand.

FIG. 5B illustrates a top view of an exemplary central section of the stand. In this view, looking downward on the stand, the stand 68 includes the top rim 78 around the outer edge of the top surface. The inner area 92 of the top surface of the stand 68 is recessed. A wall or rim 90 provides a support structure for the cap to sit when the capped container is placed with the cap in the stand. The rim 90 may also form the sidewall of the cap. The cap may slide into and out of the depression or be glued, pressed or otherwise permanently secured to the stand.

While the various modes for carrying out the invention have been described in detail, it is to be understood that the terminology used is intended to be in the nature of words and description rather than of limitation. Those familiar with the art to which this invention relates will recognize that many modifications of the present invention are possible in light of the above teachings. It is therefore to be understood that within the scope of the appended claims, the invention may be practiced in a substantially equivalent way other than as specifically described herein.

What is claimed is:

1. A method for displaying a container on a stand when the container is sealed and supporting the container when the container is unsealed, the method comprising:
    providing a chamber containing a liquid, the chamber formed by an outer wall, the outer wall having a threaded opening to the chamber and a spherical closed wall portion with an outer surface opposing the opening;
    providing a threaded cap that is part of the stand on the container that seals the liquid in the container, the stand having a curved top surface and a bottom surface;
    lifting the container containing liquid from a display position, the lifting of container causing the stand to also be lifted, the display position having the threaded opening positioned downward and sealed by the stand, the stand connected to the container by the threaded cap and supported on a bottom surface of stand by a support surface when in the display position;
    rotating the container to establish the opening pointed upward;
    rotating the stand while holding the spherical wall portion, the holding aided by the outer surface of the spherical wall portion, to remove the threaded cap, the threaded cap connected to the stand to thereby open the container;
    placing the stand on the support surface, with the bottom surface of the stand in contact with the support surface;
    dispensing liquid from the container; and
    placing the container in the stand with the threaded opening facing upward, the curved top surface of the stand supporting the spherical outer surface of the closed wall portion to maintain the threaded opening facing upward.

2. The method of claim 1, wherein the curved top surface of the stand is round.

3. The method of claim 1, wherein the threaded cap is removable from the stand.

4. The method of claim 1, wherein a curvature of the top surface of the stand is generally similar to a curvature of the spherical closed wall portion to cause the top surface of the stand to cradle the container.

5. The method of claim 1, further comprising lifting the container from the stand, the stand acting as a cradle, re-attaching the cap to seal the threaded opening, and return the stand, with attached container, to the support surface to establish the container in the display position attached to and supported by the stand.

* * * * *